(12) United States Patent  
Kasztenny et al.

(10) Patent No.: US 8,675,327 B2
(45) Date of Patent: Mar. 18, 2014

(54) FAST IMPEDANCE PROTECTION TECHNIQUE IMMUNE TO DYNAMIC ERRORS OF CAPACITIVE VOLTAGE TRANSFORMERS

(75) Inventors: Bogdan Z. Kasztenny, Markham (CA); Dale S. Finney, Sydney Mines (CA); Iulian Raducanu, North York (CA)

(73) Assignee: General Electric Company, Schenectady, NY (US)

( * ) Notice: Subject to any disclaimer, the term of this patent is extended or adjusted under 35 U.S.C. 154(b) by 423 days.

(21) Appl. No.: 11/694,420

(22) Filed: Mar. 30, 2007

(65) Prior Publication Data

US 2008/0239602 A1   Oct. 2, 2008

(51) Int. Cl.
*H02H 3/38* (2006.01)

(52) U.S. Cl.
USPC ............. 361/80; 361/78; 361/79; 700/292; 702/57; 702/58; 702/59

(58) Field of Classification Search
USPC ........ 702/35, 58, 59, 60, 64, 65, 57; 324/525; 361/79, 80, 83, 62, 65, 78; 700/292
See application file for complete search history.

(56) References Cited

U.S. PATENT DOCUMENTS

| | | | | |
|---|---|---|---|---|
| 4,321,681 | A * | 3/1982 | Sackin et al. | 700/293 |
| 4,455,612 | A * | 6/1984 | Girgis et al. | 700/294 |
| 4,706,156 | A * | 11/1987 | Caunce | 361/80 |
| 4,821,137 | A * | 4/1989 | Wilkinson | 361/80 |
| 5,367,426 | A * | 11/1994 | Schweitzer, III | 361/80 |
| 5,453,903 | A * | 9/1995 | Chow | 361/79 |
| 5,703,745 | A | 12/1997 | Roberts et al. | |
| 5,796,630 | A * | 8/1998 | Maeda et al. | 361/160 |
| 5,909,656 | A * | 6/1999 | Yang | 702/77 |

(Continued)

FOREIGN PATENT DOCUMENTS

| | | |
|---|---|---|
| JP | 8163772 A | 6/1996 |
| JP | 2003528554 A | 9/2003 |
| WO | 0171874 A2 | 9/2001 |

OTHER PUBLICATIONS

Kezunovic et al., "Design Optimization and Performance Evaluation of the Relaying Algorithms, Relays and Protective Systems Using Advanced Testing Tools", IEEE Transactions on Power Delivery, vol. 15, Issue 4, Oct. 2000, pp. 1129-1135.*

(Continued)

*Primary Examiner* — Mohamed Charioui
*Assistant Examiner* — John Kuan
(74) *Attorney, Agent, or Firm* — Cantor Colburn LLP

(57) ABSTRACT

The present invention relates to methods for providing impedance protection differentiating between in-zone and out-of-zone faults based on instantaneous, digitally derived operating and polarizing distance comparator signals. The method uses a pair of fast orthogonal filters to derive D and Q components of the input voltages and currents. Two sets of operating and polarizing signals are derived for better speed of response under varying fault moment with respect to the peaks and zero crossings of power signals. Three stages of comparison between the operating and polarizing impedance terms are used. These comparator stages use half a cycle averaging windows, and three-quarters-of-a-cycle windows. The first stage of comparison is based on energy comparator responding to both magnitude and phase information in the signals. Stages 2 and 3 are of phase comparison type, responding mostly at the phase information and neglecting the magnitude information for better immunity to noise and signal distortions.

11 Claims, 9 Drawing Sheets

(56) References Cited

U.S. PATENT DOCUMENTS

| | | | |
|---|---|---|---|
| 6,046,895 A * | 4/2000 | Jurisch et al. | 361/79 |
| 6,137,666 A * | 10/2000 | Wang | 361/80 |
| 6,239,959 B1 * | 5/2001 | Alexander | 361/85 |
| 6,420,875 B1 | 7/2002 | Kasztenny et al. | |
| 6,442,010 B1 * | 8/2002 | Kasztenny et al. | 361/63 |
| 6,456,947 B1 * | 9/2002 | Adamiak et al. | 702/59 |
| 6,459,960 B1 * | 10/2002 | Shuto et al. | 700/293 |
| 6,654,220 B2 * | 11/2003 | Stanimirov et al. | 361/79 |
| 6,829,544 B1 * | 12/2004 | Kasztenny et al. | 702/59 |

OTHER PUBLICATIONS

Andrichak et al., "Distance Relay Fundamentals" Protection and Control Journal, Mar. 2007, pp. 63-72.*

Office Action from corresponding JP Application No. 2008-085797, dated Mar. 19, 2013.

Extended European Search Report for EP Application No. 08153006.5-1806, dated Aug. 30, 2013, pp. 1-6.

* cited by examiner

FAST IMPEDANCE PROTECTION TECHNIQUE IMMUNE TO DYNAMIC ERRORS OF CAPACITIVE VOLTAGE TRANSFORMERS

BACKGROUND OF THE INVENTION

1. Field of the Invention

This invention relates to the fast and accurate detection of faults on transmission lines in the presence of noise, and particularly to transients caused by Capacitive Voltage Transformers.

2. Description of Background

Protective relays are devices that are designed to identify and isolate failures in a power system. A failure often takes the form of an insulation breakdown (fault) that result in a change in the system voltage and/or current. Protective relays are applied in the power system in such a way that each relay is configured to detect failures within a specific portion of the power system commonly referred to as a zone.

Impedance relays respond to current and voltage as a function of the electrical impedance between the relay location and the location of the fault. The configuration parameter that defines the zone of a distance relay is commonly referred to as the reach. A protective relay should never respond to any event other than a fault within its particular zone. Further, the longer a fault persists in a power system, the greater the likelihood that the stability of the entire power system will be compromised. Therefore, a protective relay should be able to identify faults within its zone in a minimum possible time period.

Typically, in a microprocessor-based impedance relay, a discrete Fourier transform (DFT) calculates phasor values from samples of waveforms taken over a fixed period of time (a window). A DFT rejects harmonics of the fundamental frequency when taken over a full power cycle. The approach is problematic since the time that is required to detect a fault is a function of the length of the Fourier window, thus a shorter window generally produces a faster operating time. However, as the length of a window is shortened it becomes more difficult to discriminate between the fundamental frequency component and other components. For example, in the instance that a window length is shortened to a half (½) power cycle the DFT rejects only odd harmonics.

Accurate determination of the fault location typically requires the extraction of the fundamental frequency phasor components of a post-fault voltage and current. However, the post-fault voltage and current will contain other components. Further, a decaying DC component will exist in the current signals due to the point-on-wave at which the fault occurs and the inductive time constant of the system. Similarly, Capacitive Voltage Transformers (CVTs), arc resistance variations, shunt capacitance, and traveling waves effects also generate transients that negatively impact the phasor estimation process.

CVTs create a particular challenge for fast impedance protection functions, particularily under so called high Source to Impedance Ratios (SIRs). During faults when the input CVT voltage undergoes abrupt changes in its magnitude, the output CVT voltage used by protective relays includes significant transients associated with energy stored in the internal components of the CVT that need to re-adjust for a different input voltage level. These transients can reach 20-50% of the nominal voltage in magnitude and be relatively close to the nominal system frequency. This makes them very difficult to filter out particularly within the short time period in which protective relays are expected to operate.

Under high SIRs the steady state voltage measured by a protective relay for faults at the boundary of the protection zone can be very low, as low as 3-5% of the nominal value. With the CVT transients reaching 20-50% and the signal of interest dropping to 3-5%, the noise-to-signal ratio can be as high as 10. Not only is the noise very high, but its frequency spectrum is very close to the signal of interest at least for 1-2 power cycles in which the relay is expected to operate.

One method of dealing with the CVT transient is to insert a filter into the voltage signal path that is an inverted representation of the CVT transfer function. This removes the distortion generated by the CVT resulting in a signal that is an accurate reproduction of the power system voltage. This method performs optimally only when the filter coefficients reflect the parameters of the particular CVT that is connected to the relay.

Another approach is to apply a short Fourier window with a correspondingly reduced reach at fault inception and to increase both the window length and zone of coverage throughout the duration of the fault up to some fixed limit. While this approach can produce faster operation times for faults located close to the relay, it does not improve the performance throughout the zone protected by the relay. A detection algorithm can also be based on a model of the power system. In particular, a series R-L model of the faulted transmission line implies that the voltage and current must satisfy a first order differential equation.

Presently, there exists a need for a solution that relates to an impedance algorithm that can identify faults within its zone by processing samples of the waveforms in the time domain—without the need of a DFT. Further, the time required for detection should be less than one power cycle for faults throughout much of the zone of protection.

SUMMARY OF THE INVENTION

The present invention relates to a method of method for providing impedance protection, the method comprising interfacing and digitizing voltage and currents associated with a protected circuit, digitally separating input currents and voltages into pairs of orthogonal components, creating distance comparator terms digitally in the form of instantaneous operating and polarizing signals, and digitally checking the angular relationship between the operating and polarizing signals.

Article of manufacture and computer program product corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
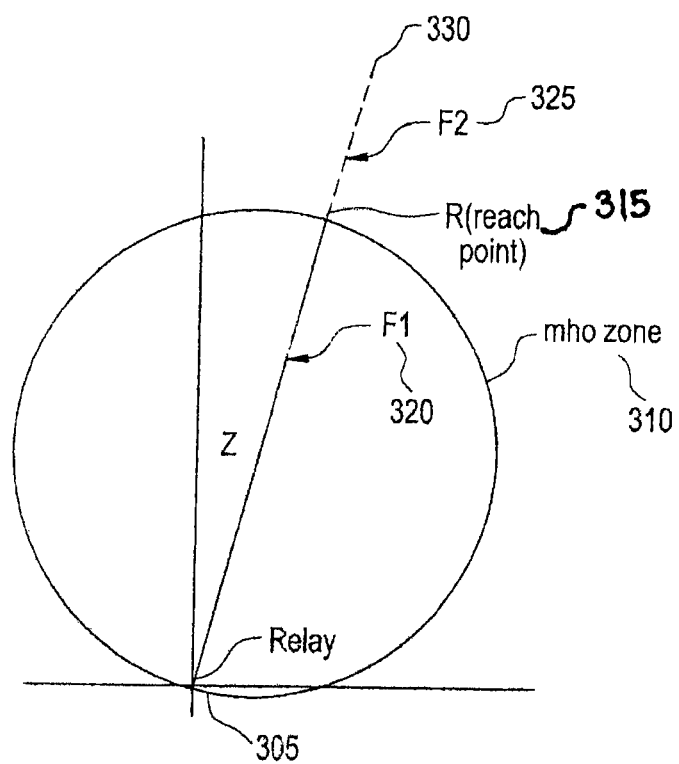
FIG. 1 illustrates the concept of a distance zone using the example of a mho characteristic.

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

Aspects of the present invention generally relate to an impedance algorithm that can identify faults within its zone by processing samples of the waveforms in the time domain—without the need of a DFT. The time required for detection is less than one power cycle for faults throughout much of the zone of protection. Aspects of the invention form the traditional impedance characteristics of a distance relay such as mho, reactance, blinders, phase selection and other as per the art of impedance protection but in the time domain rather than the frequency domain.

The traditional frequency domain approach to impedance protection extracts phasors of currents and voltages, and applies the impedance characteristics to the phasors of currents and voltages. This approach reduces the number of required calculations and eliminates some noise components that otherwise obstruct accurate fault detection, but also rejects useful information that otherwise can be used to improve the fault detecting process particularly in terms of speed of operation.

The approach as described herein derives the impedance characteristics in the time domain preserving more of the information contained in the input voltages and currents. This includes both the information and the noise components. However, some of the noise components will naturally cancel in the impedance characteristics without the need to artificially suppress them by explicit filtering. Some other noise components can be dealt with better if they remain preserved in the impedance characteristics, rather than dealt with in each individual input signal.

Aspects of embodiments of the present invention allow for the fast and secure detection of faults from the time-domain versions of the impedance characteristics by applying a three-stage approach to the fault detection and location process. First, an energy-based comparator is used in the first half of a power cycle following the system event. This allows for very fast detection of clear (obvious) fault cases. This first stage is inhibited after the initial half a cycle because if left operational, it would exhibit security problems in the second and third half cycles due to CVT transients.

Second, a phase comparison comparator is used in the second half cycle of the system event, after the first stage in inhibited. This comparator monitors polarities of the so-called operating and polarizing signals in addition to some other features of these signals. These feature include first and second order derivatives of the involved signals, and focus around checking their polarities and temporal patterns that characterize alternating currents and voltages as compared with irregular signals such as the ones caused by CVT transients. This second stage intentionally limits the usage of the information contained in signal magnitudes, and utilizes to a greater extent the information contained in the signal phase or temporal position with respect to other signals.

The third and final stage is activated in the second power cycle. This third stage is a variant of the second stage, but is optimized for the noise characteristics expected during the second cycle of a system disturbance.

The method uses two parallel paths for faster fault detection. One path uses the so-called direct components of the involved signals as inputs, while the other the so-called quadrature component of the signals as inputs with the following justification.

Line faults that are to be detected by impedance protection functions happen at random moments with respect to the normally alternating currents and voltages associated with the protected line. The protected line and the CVTs typically used for sensing the high voltage signals, respond differently depending on the moment of fault inception as related to the peaks and zero crossings of the power signals. The direct and quadrature components in this invention are designed in such a way that when one of the two responds slower because of the specific nature of the transient signals, the other is naturally faster; and vice versa.

Distance Zones and Basic Operating Equations

Impedance protection functions locate faults within the pre-defined operating characteristic, typically referred to as a distance zone. A distance zone stretches from the point at which a distance relay is installed to a point a certain distance away. The notion of distance is based on measuring the apparent impedance using the voltage and current available at a location point of a given impedance/distance relay. A transmission line typically has a homogeneous impedance distributed over its length. This property gives rise to the relationship between impedance and distance.

Typically, a distance zone extends from the relay location in a forward or reverse direction. Special applications use non-directional zones that extent in both forward and reverse directions. The key performance characteristic for any distance zone is the finite reach. This means that a given zone operates (responds to) faults located up to a certain electrical distance away from the relay, and does not operate for fault beyond that pre-specified point. The difference between the fault location yielding a solid operation of a given zone (the zone operates each time a fault is applied), and the point of solid no-operation (the zone never operates when the fault is applied) is referred to as transient overreach and is one of the two most important performance metrics of a distance function. The other metric is the speed of response to internal faults. A distance function with smaller difference between the solid operate and solid no-operate points, and with faster operating times is considered superior.

A distance zone can be shaped using several impedance characteristics. A characteristic is a boundary line demarcating the operate and no-operate regions based on the values of currents and voltages at the relay location. Two typical families of characteristics are the mho and quadrilateral characteristics. As illustrated in FIG. 1, a mho zone 310 can be thought of as a circle stretched between the relay location 305 and the intended reach point of the zone 315. The latter can be thought of as a polygon bounding the in-zone and out-of-zone fault locations (320, 325) with a reactance line 330 intersecting the intended reach point.

Practical mho and quadrilateral distance functions incorporate a number of extra characteristics such as directional supervision, phase selection supervision, load encroachment supervision, blinders to name a few. These characteristics are important but their design and implementation is secondary to the main problem of distance protection, that being transient accuracy and speed of operation.

With the respect of transient accuracy and speed of operation two distance characteristics are critical: mho and reactance characteristics.

A mho characteristic is shaped by comparing the following conceptual signals:

$$S_{OP} = I \cdot Z - V \quad \text{(Eq.1a)}$$

$$S_{POL} = V_{POL} \quad \text{(Eq.1b)}$$

The operating signal is built around the balance equation between the voltage as measured at the relay location (V), the current causing a voltage drop along the protected circuit between the relay point and the intended reach point (I) and the electrical distance of the protected circuit, here expressed as an impedance Z. The polarizing signal is traditionally selected to indicate if the fault is internal to the zone (F1 in FIG. 1) or external to the zone (F2 in FIG. 1). For internal faults, the operating and polarizing signals are approximately in phase; for external faults the two signals are approximately out of phase.

A variety of solutions are used to form the polarizing signal with the goal to ensure proper directionality during close-in faults that depress the voltage at the relay location to very small values. Memory polarization, cross-phase polarization, or a combination of the two is used in practical implementations. This invention is not concerned with the specific way of producing the polarizing signal.

A reactance characteristic is formed using a similar approach but assuming a significant fault resistance is present at the fault location. Careful analysis of the current-voltage balance equation allows writing a different set of operating and polarizing signals yielding better performance in terms of their ability to detect faults with significant resistance:

$$S_{OP} = I \cdot Z - V \quad \text{(Eq.2b)}$$

$$S_{POL} = I_{POL} \quad \text{(Eq.2a)}$$

Again, for in-zone faults the operating and polarizing signals are approximately in phase, and for out-of-zone faults, they are approximately out of phase.

A number of approaches exist for selecting the proper polarizing currents. So-called neutral and negative-sequence currents are good choices used in practical implementations. The present invention is not concerned with any specific form of the polarizing current for the reactance characteristic.

Practical implementations in poly-phase (three-phase) power systems apply special equations to derive the terms V, I, $V_{POL}$ and $I_{POL}$ in equations (1) and (2). This belongs to the existing art of distance protection and does not concern this invention. In this document we use the term I, V, Z, $V_{POL}$ and $I_{POL}$ with the understanding that they are applied to polyphase power grids according to the known rules of impedance protection.

A fast and accurate impedance function must derive the operating and polarizing signals and decide if the two are approximately in phase or out of phase. This must be done under the presence of severe noise and within a very short period of time, a small fraction of the power cycle at which the relay input voltages and currents alternate.

To meet this challenge a typical microprocessor-based relay would extract a so-called phasors (magnitude and angle information represented by a complex number) of the relay input signals and calculate the operating and polarizing signals per general equations (1) and (2) and subsequently check if the two complex numbers (operate and polarizing) are approximately in phase or out of phase.

In such approach the design effort is two-fold. First one tries to extract the phasors without introducing too much delay, but reject as much noise as possible. Second, a number of logical conditions are checked in addition to the angle relations between the operating and polarizing signals. The above is a broad generalization, but an accurate summary of the "frequency domain" approach—in short the information contained in the fundamental frequency components of the currents and voltages is extracted by digital filtering and only after that it is used to shape the distance zones of operation.

Aspects of the present invention allow for the reversal of this process. Further, the carrying of all the signal components, both beneficial signal components (the information) and the obstructing signal components (the noise) into the fault detection process is allowed.

In this invention the basic distance operating characteristics exemplified above by equations (1) and (2) are created in a "time domain". Recognizing transmission lines can be represented by a resistance and inductance connected in series, the instantaneous operating signal can be conceptually re-written to the following format:

$$s_{OP}(t) = R \cdot i(t) + L \cdot \frac{di(t)}{dt} - v(t) \quad \text{(Eq. 3)}$$

The approach depicted by equation (3) is a foundation of a number of methods of measuring the apparent impedance or locating faults. Our invention does not use equation (3) or any of the known solutions of it that would lead to the measurement of the apparent impedance, but applies a better solution improving compared with both heavily filtered frequency domain approach of equations (1) or (2) and purely instantaneous time domain approach of equation (3).

In our invention a short-window orthogonal filters are used to condition the input currents and voltages. A window length of a small fraction of a power cycle is used to avoid delaying the flow of information, and adversely impacting the speed of operation of the distance functions. At the same time, the filters do not attempt to reject noise from the input signals. Such rejection is not possible in the first place without significant impact on the speed of operation. The term "orthogonal filters" refers to a matched pair of filters that mathematically meet the condition of being "perpendicular". From the engineering perspectives these filters are designed to yield the "real" and "imaginary" components in the time domain.

All input currents in our invention are filtered using the direct (D) and quadrature (Q) orthogonal filters, effectively producing the following mapping between the raw input currents and their orthogonal components:

$$[i] \rightarrow [i_D\ i_Q] \quad \text{(Eq.4a)}$$

Similarly all input voltages are processed using the direct filter (D) only:

$$[v] \rightarrow [v_D] \quad \text{(Eq.4b)}$$

Equations (4) typically apply to three voltages and three currents in a poly-phase practical power system. These phase voltages and currents are first filtered by equations (4) and next combined into proper composite signals as per the art of impedance protection in poly-phase systems. An example of this combination will be given later for clarity, although this invention is not concerned with the details of impedance protection in poly phase systems.

One particular implementation uses the following Finite Impulse Response (FIR) filters to extract the D and Q components in the currents and voltages:

$$x_{D(k)} = \sum_{i=0}^{N_{DQ}-1} h_{D(i)} \cdot x_{(k-i)} \quad \text{(Eq. 5a)}$$

$$x_{Q(k)} = \sum_{i=0}^{N_{DQ}-1} h_{Q(i)} \cdot x_{(k-i)} \quad \text{(Eq. 5b)}$$

Where the window length $N_{DQ}$ is selected as $\frac{1}{8}^{th}$ of the power system cycle, and the filter coefficients are calculated as follows:

$$h_{D(i)} = G_D \cdot \cos\left(\pi \cdot \frac{i - \frac{N_{DQ}-1}{2}}{N_{DQ}}\right), i = 0 \cdots N_{DQ}-1 \quad \text{(Eq. 6a)}$$

$$h_{Q(i)} = G_Q \cdot \sin\left(\pi \cdot \frac{i - \frac{N_{DQ}-1}{2}}{N_{DQ}}\right), i = 0 \cdots N_{DQ}-1 \quad \text{(Eq. 6b)}$$

The multipliers are selected to yield a unity gain at the nominal system frequency, therefore:

$$G_D = \frac{\cos(\alpha) - \cos\left(\frac{\pi}{N_{DQ}}\right)}{2 \cdot \cos\left(\frac{\alpha \cdot N_{DQ}}{2}\right) \cdot \sin\left(\frac{\pi}{2 \cdot N_{DQ}}\right) \cdot \cos\left(\frac{\alpha}{2}\right)} \quad \text{(Eq. 7a)}$$

$$G_Q = \frac{\cos(\alpha) - \cos\left(\frac{\pi}{N_{DQ}}\right)}{2 \cdot \cos\left(\frac{\alpha \cdot N_{DQ}}{2}\right) \cdot \cos\left(\frac{\pi}{2 \cdot N_{DQ}}\right) \cdot \sin\left(\frac{\alpha}{2}\right)} \quad \text{(Eq. 7b)}$$

Where the above equations use angles in radians, and:

$$\alpha = \frac{2 \cdot \pi}{N_1} \quad \text{(Eq. 7c)}$$

Where $N_1$ is the number of samples taken by the relay in one full cycle of the power frequency. One particular implementation uses $N_1 = 128$.

It must be noted that the filters, their window lengths, and coefficients are secondary in this invention. Those of ordinary skill in the art can re-arrange other aspects of this invention in order to utilize different filters.

Note that the output of the D and Q filters suppress only very high frequency noise and reject completely a constant dc offset in the input signals. Signal components in the lower spectrum will pass through the short window filters. For a sine-wave input at power frequency, the two filters yield sine-wave outputs with the unity gain and shifted by quarter of the power cycle (90 electrical degrees). From this perspective the two filters (DQ) are fast estimators of the "real" and "imaginary" parts of the signals.

The above observation allows re-writing the operating signals of the mho or reactance comparators as follows:

$$S_{OP\_D} = i_D \cdot R - i_Q \cdot X - v_D \quad \text{(Eq.8a)}$$

Where the R and X terms are derived from the pre-set reach of the distance function. These terms are constant and are pre-calculated as follows:

$$R = Z_{MAG} \cdot \cos(Z_{ANG}) \quad \text{(Eq.8b)}$$

$$X = Z_{MAG} \cdot \sin(Z_{ANG}) \quad \text{(Eq.8c)}$$

Where $Z_{MAG}$ and $Z_{ANG}$ are magnitude and angle of the impedance signifying the intended reach point of the distance function. Typically, these are adjustable and determined by the user (settings).

Equation (8a) needs a polarizing signal to become a part of the distance function. For illustration purposes let us consider the reactance comparator polarized from the negative-sequence current.

First, it must be recognized that the positive-sequence, negative-sequence and zero-sequence components in a three-phase power system are mathematically defined only for steady state conditions, and are technically calculated from the phasors of the three phase voltages and currents. In short, the symmetrical components are concepts from the frequency domain, and do not fit directly our time domain invention. This is easily overcome by applying the following equation derived by mimicking the exact mathematical definition of sequence components. Let us define an auxiliary function as follows:

$$f(a, b, c, d, e) = \frac{1}{3} \cdot \left(a - \frac{1}{2} \cdot (b+d) + \frac{\sqrt{3}}{2} \cdot (e-c)\right) \quad \text{(Eq. 9)}$$

Now, the negative-sequence instantaneous current, component D referenced to phase A is calculated as:

$$i_{2D} = f(i_{AD}, i_{CD}, i_{CQ}, i_{BD}, i_{BQ}) \quad \text{(Eq.10a)}$$

The Q component is derived as:

$$i_{2Q} = f(i_{AQ}, i_{BQ}, i_{BD}, i_{CQ}, i_{CD}) \quad \text{(Eq.10b)}$$

The above exemplifications of the negative-sequence instantaneous current hold true for the ABC phase rotation. Those skilled in basics of three phase power systems will derive matching equations for the ACB rotation and for the positive- and zero-sequence components.

Having the negative-sequence instantaneous current defined by equations (10), we return to the example of the negative-sequence polarized reactance characteristic. Assume one considers the phase a distance loop as per the art of impedance protection in poly-phase systems. The loop voltage v in equation (8a) in the phase A to ground voltage input; the loop current in equation (8a) in the phase A current compensated for the zero-sequence coupling between the phases. Therefore, the following implementation equations are used prior to using equation (8a):

$$V_D = V_{AD} \quad \text{(Eq. 11a)}$$

$$i_D = i_{AD} + \frac{1}{3} \cdot (i_{ND} \cdot A_D - i_{NQ} \cdot A_Q + i_{GD} \cdot B_D - i_{GQ} \cdot B_Q) \quad \text{(Eq. 11b)}$$

$$i_Q = i_{AQ} = \frac{1}{3} \cdot (i_{ND} \cdot A_Q + i_{NQ} \cdot A_D + i_{GD} \cdot B_Q + i_{GQ} \cdot B_D) \quad \text{(Eq. 11c)}$$

Where the instantaneous neutral current ($i_N$) is obtained using the following equations:

$$i_{ND} = i_{AD} + i_{BD} + i_{CD} \quad \text{(Eq.11d)}$$

$$i_{NQ} = i_{AQ} + i_{BQ} + i_{CQ} \quad \text{(Eq.11e)}$$

The ground current from a parallel line (if any) is measured directly ($i_G$), and the coefficients derived from user setting and defining the self- and mutual line coupling are as follows:

$$A_D = k_{0\_MAG} \cdot \cos(k_{0\_ANG}) - 1 \quad \text{(Eq.11f)}$$

$$A_Q = k_{0\_MAG} \cdot \sin(k_{0\_ANG}) \quad \text{(Eq.11g)}$$

$$B_D = k_{0M\_MAG} \cdot \cos(k_{0M\_ANG}) \quad \text{(Eq.11h)}$$

$$B_Q = k_{0M\_MAG} \cdot \sin(k_{0M\_ANG}) \quad \text{(Eq.11i)}$$

Where the $k_0$ and $k_{0M}$ are complex numbers (magnitude, MAG and angle, ANG) defining the amount of coupling in the protected line and between the protected and parallel line (if any). Typically these numbers are user settings.

Using equations (11) one defines the operating signal given generally by equation (8) for the A-loop ground distance protection ($S_{AOP\_D}$). The matching polarizing signal ($S_{APOL\_D}$), continuing the example of the negative-sequence polarized reactance characteristic is defined as:

$$S_{APOL\_D} = i_{2AD} \cdot R - i_{2AQ} \cdot X \quad \text{(Eq.12a)}$$

Where the auxiliary terms R and X in equation (12a) are related to the so-called non-homogeneity angle setting ($H_{ANG}$) as per the art of distance protection:

$$R = -\sin(H_{ANG}) \quad \text{(Eq.12b)}$$

$$X = \cos(H_{ANG}) \quad \text{(Eq.12c)}$$

Equation (8) with the current and voltage signals substituted for the phase-A ground distance loop as per equations (11) constitutes an instantaneous operating signal of the reactance comparator in this example. Equation (12) defines the polarizing signal for this comparator, assuming the negative-sequence current polarization. Both the signals are sine waves under steady state conditions, and carry distortions during transients. For in-zone faults the two signals are approximately of the same polarity (in-phase), and for out of zone faults, the two signals are approximately of inverse polarity (out-of-phase). This is illustrated in FIGS. 2 and 3, respectively.

Figure 2A:
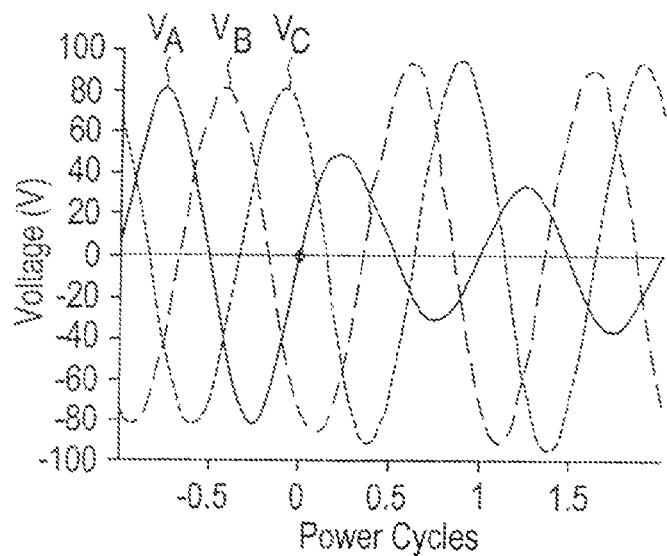
FIGS. 2A-2C illustrate the concept of instantaneous operating and polarizing signals for a sample reactance line polarized from the negative-sequence current.
Figure 2B:
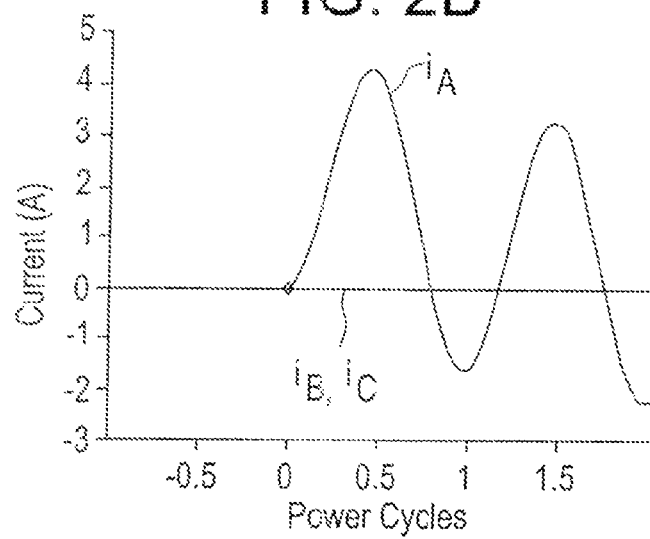
Figure 2C:
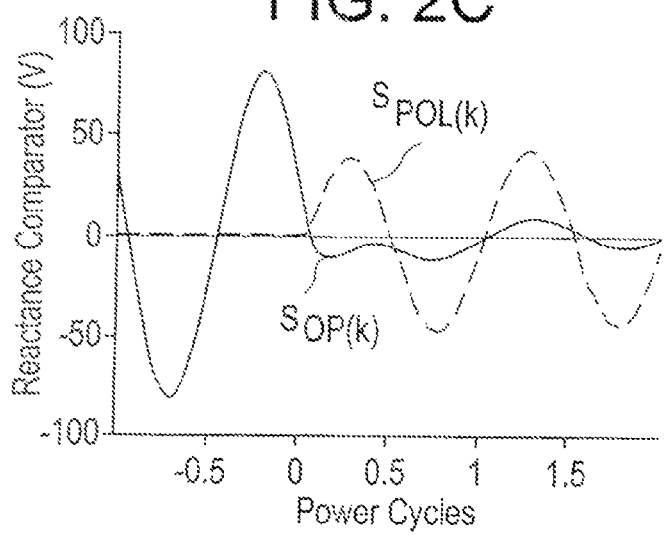

FIGS. 2A-2C illustrate the concept of instantaneous operating and polarizing signals for a sample reactance line polarized from the negative-sequence current. The plot of FIG. 2A shows the three-phase voltage measured by the relay. The plot of FIG. 2B shows the three-phase currents measured by the relay. The plot of FIG. 2C shows the operating and polarizing signals of the phase-A reactance comparator. An in-zone fault is shown; the influence of heavy CVT generated transients is visible in the operating signal. When the CVT transient decays (at about 0.8 cycles into the fault), it becomes clear the polarizing and operating signals are in phase, as expected for an in-zone fault.

Figure 3:
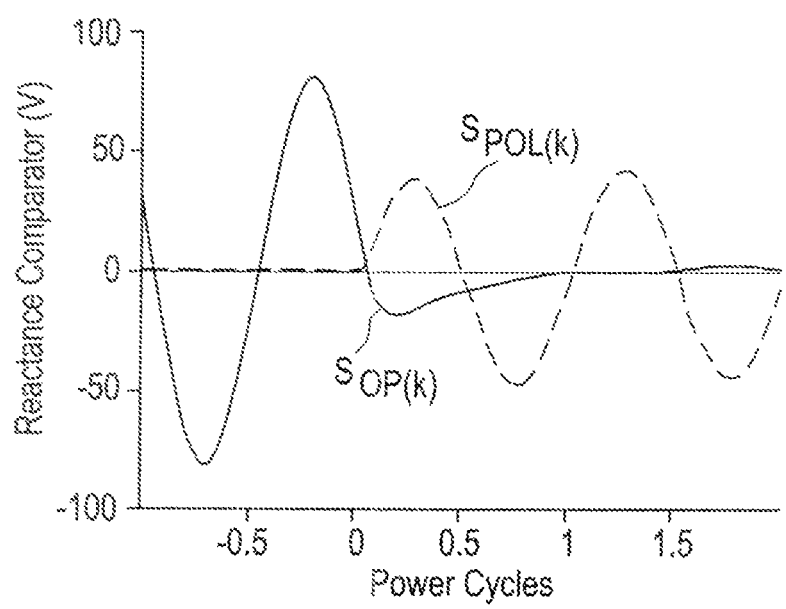
FIG. 3 complements the example of FIGS. 2A-2C by showing an out of zone fault.

FIG. 3 complements the example of FIGS. 2A-2C by showing an out of zone fault. When the CVT transient decays (at about 1.5 cycles into the fault), it becomes clear the polarizing and operating signals are out of phase, as expected for an out-of-zone fault.

The above description is not meant to substitute the overall art of distance protection, with many different approaches known and applied in practice. It is meant to illustrate that the time domain approach can be expanded on the traditional body of knowledge of impedance protection traditionally written for the frequency domain. Those skilled in basics of protective relaying can derive a full suite of implementation equations for memory voltage polarization, cross-phase polarization, compensation for self and mutual coupling, power transformer compensation, directional checks, fast magnitude estimators, and other aspects commonly used in distance protection.

Within aspects of the present invention attention is paid to the application of fast orthogonal filters to extract the basic D and Q dimensions of the input signals, and carrying the subsequent calculations in the time domain as exemplified above for the phase-A ground distance reactance comparator polarized from the negative-sequence current. Applying fast orthogonal components and preserving speed with less emphasis on noise removal in the time domain approach has an advantage of letting many noise components in the operating and polarizing signals cancel out or become irrelevant given the strength of the signal components carrying information. The outstanding noise components and signal distortions are carefully analyzed and dealt with accordingly, without the brute force approach of filtering each and every input signal in a similar manner, and disregarding the many various applications for those input signals.

D and Q Operating and Polarizing Signals

In the previous section we derived the concept of instantaneous operating and polarizing signals. These were written in the D domain, which is in reference to the direct (D) components in the voltage inputs to the relay.

Input signals to a distance relay contain different transient characteristics depending on the point-on-wave on which a given fault happens to take place. The point-on-wave term refers to a temporal position of the moment of fault inception with respect to peaks and zero crossings of the voltages and currents in the system. It is a well-recognized fact for example that faults on a typical high voltage line occurring at the voltage zero crossings generate large asymptotically decaying dc offset components in the fault currents. Further, faults at the peak of the voltage generate more high frequency noise components in the voltage signal during faults. Yet further, faults at the voltage zero crossing create much larger CVT transients compared with faults occurring the peak of the voltage. All this translates into different noise patterns in our instantaneous operating and polarizing signals.

The signals referenced to the D axis behave better under some faults and exhibit larger noise components and delays for faults occurring at different points on wave. Therefore, according to another embodiment of our invention a second set of operating and polarizing signals is used to speed up the operation of the distance functions. This second set is referred to as the Q components. The Q components are obtained by applying the second quadrature filter ($h_{Q1}$) to the direct (D) operating and polarizing signals. This can be symbolically written as:

$$S_{OP\_D} \xrightarrow{h_{Q1}} S_{OP\_Q} \quad \text{(Eq. 13a)}$$

$$S_{POL\_D} \xrightarrow{h_{Q1}} S_{POL\_Q} \quad \text{(Eq. 13b)}$$

With the second quadrature filter derived from the already used D and Q filters as follows:

$$h_{Q1(i)} = \cos(\beta_{Q1}) \cdot h_{Q(i)} + \sin(\beta_{Q1}) \cdot h_{D(i)} \quad \text{(Eq. 13c)}$$

where:

$$\beta_{Q1} = \alpha \frac{N_{DQ} - 1}{2} \quad \text{(Eq. 13d)}$$

The Q components are particularly useful for the reach-controlling characteristics of a distance zone: mho and reactance. Other characteristics such as blinders, directional checks and similar can still use both D and Q components, but with a slightly diminishing gain compared with using just the D component.

It needs to be emphasized that the implementation format given by equations (13) can be easily rearranged to an equivalent form by those skilled in digital signal processing. Format (13) applies a cascade filter $h_{Q1}$ to the D components of the operating and polarizing signals. An alternative format, for example, can apply a cascade of the $h_D$ and $h_{Q1}$ filter to the voltage and currents signals; and another cascade of the $h_Q$ and $h_{Q1}$ filters to the voltage and current signals, and create the Q components in the operating and polarizing signals using mirror equations compared with the D components of those signals. Such re-arrangement is exactly equivalent, and as such it is covered by this invention.

Figure 4:
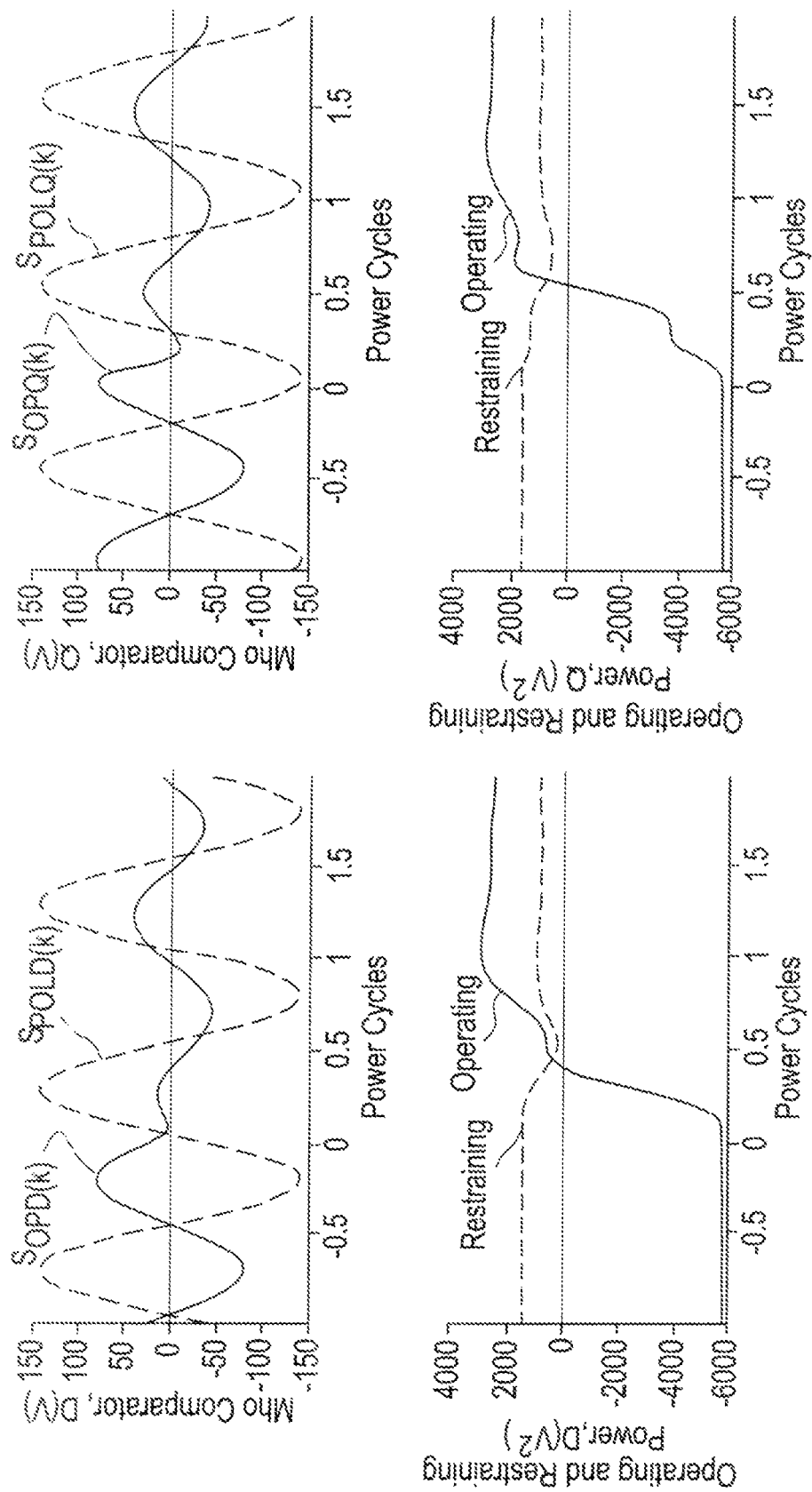
FIG. 4 illustrates the purpose of the Q components of the operating and polarizing signals.
Figure 5:
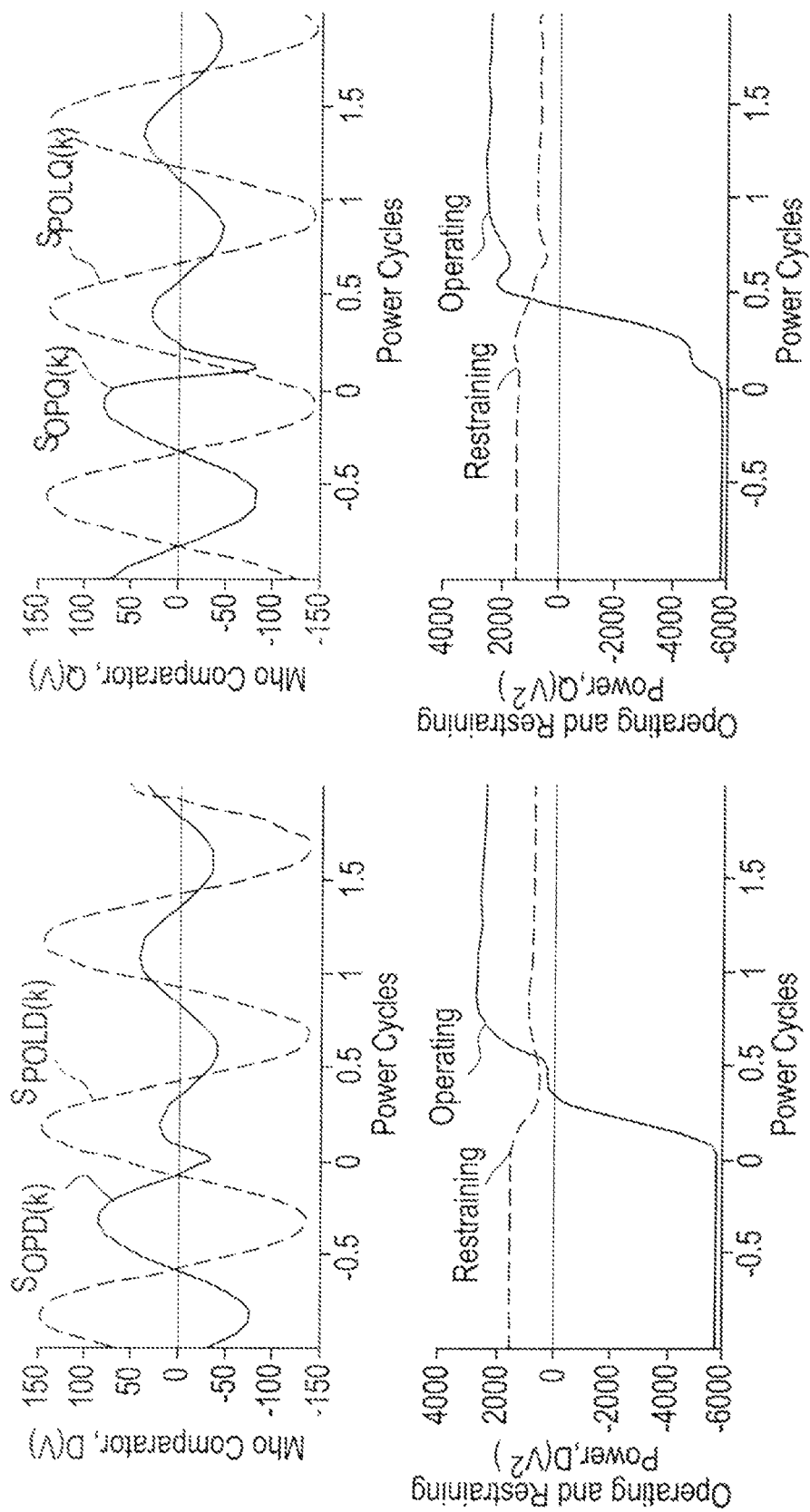
FIG. 5 complements FIG. 4 by showing the same situation but for a fault occurring in about 45 electrical degrees past the voltage zero crossing.

FIGS. 4 and 5 illustrate the positive impact of using simultaneously the D and Q pairs of the operating and polarizing signals. FIG. 4 illustrates the purpose of the Q components of the operating and polarizing signals. With the occurrence of the zero crossing of the voltage signal, this fault can be faster identified via the D-set of operating and polarizing signals (in about 0.4 of a power cycle). FIG. 5 complements FIG. 4 by showing the same situation but for a fault occurring in about 45 electrical degrees past the voltage zero crossing. This fault can be faster identified when looking at the Q-set of operating and polarizing signals.

It should be recognized that aspects of this embodiment can be carried forward on three, four, or more different versions of the operating and polarizing signals. Such pairs of signals will have to be created by using filters with windows positioned along various portions of a sine wave spanning at least half the rotation (180 electrical degrees). Application of more than two sets of pairs of the operating and polarizing signals would bring some extra diminishing gains, and is already recognized by this invention.

Energy Comparator of the First Stage

The next step in locating faults, is deciding if the fault is internal and should be operated upon by the distance relay, or is external and the said relay should restrain, so to compare the mutual polarity between the operating and polarizing signals of each distance comparator. Such comparison should be both fast and secure, despite the many transients that may occur in the operating and often in the polarizing signals of a given comparator.

Within aspects of this embodiment of the present invention an energy-based comparator is used to detect if the operating and polarizing signals are approximately in phase or approximately out of phase. The implementation equations for a microprocessor-based relay with this respect can be summarized as follows:

The operating and polarizing signals are declared "in phase" if:

$$P_{OP\_POL(k)} > \sqrt{X^2_{OP\_RMS(k)} \cdot X^2_{POL\_RMS(k)}} \cdot K_{OP\_POL(\Theta)} \quad \text{(Eq. 14)}$$

Where $$X_{OP\_POL(k)} = x_{OP(k)} \cdot x_{POL(k)} \quad \text{(Eq.15a)}$$

The operating power is calculated as follows:

$$P_{OP\_POL(k)} = \frac{2}{N_1} \sum_{i=0}^{i=\frac{N_1}{2}-1} X_{OP\_POL(k-i)} \quad \text{(Eq. 15b)}$$

$$X^2_{OP\_RMS(k)} = \frac{2}{N_1} \sum_{i=0}^{i=\frac{N_1}{2}-1} x^2_{OP(k-i)} \quad \text{(Eq. 15c)}$$

$$X^2_{POL\_RMS(k)} = \frac{2}{N_1} \sum_{i=0}^{i=\frac{N_1}{2}-1} x^2_{POL(k-i)} \quad \text{(Eq. 15d)}$$

$$K_{OP\_POL(\Theta)} = \cos(\Theta_{LIM} - \Theta_{SEC}) \quad \text{(Eq. 15e)}$$

In equation (1) the operating power (left hand side) is compared against the restraining power (right hand side). If the operating power is greater than the restraining power an auxiliary flag is asserted signifying the fault has been located within the reach of this particular comparator. The two angles in equation (15e) are the comparator limit angle, a user setting typically set between 60 and 120 degrees; and the security angle being a factory constant set in one implementation at about 5 to 15 degrees depending on the type of a specific distance comparator.

The power signals are calculated over the window of half a power cycle for speed. This filtering is performed on the operating and polarizing signals, and is a good compromise between the speed and security. The operating power integrates up the signal strength in time intervals when the operating and polarizing signals are of the same polarity, and integrates down when the polarities are different. The higher the signals during such periods, and the longer the periods, the bigger the change in the operating power. The operating power is restrained with the overall strength of the two involved signals in order to keep the in-phase/out-of-phase pattern detection in proportion to the levels of the involved signals.

Figure 6A:
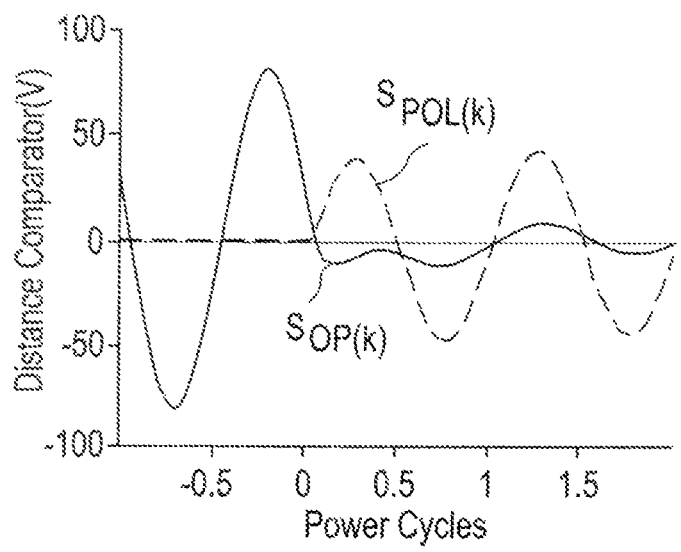
FIG. 6A shows a sample operating and polarizing signals and FIG. 6B shows the resulting operating and restraining powers for the first stage of comparison.
Figure 6B:
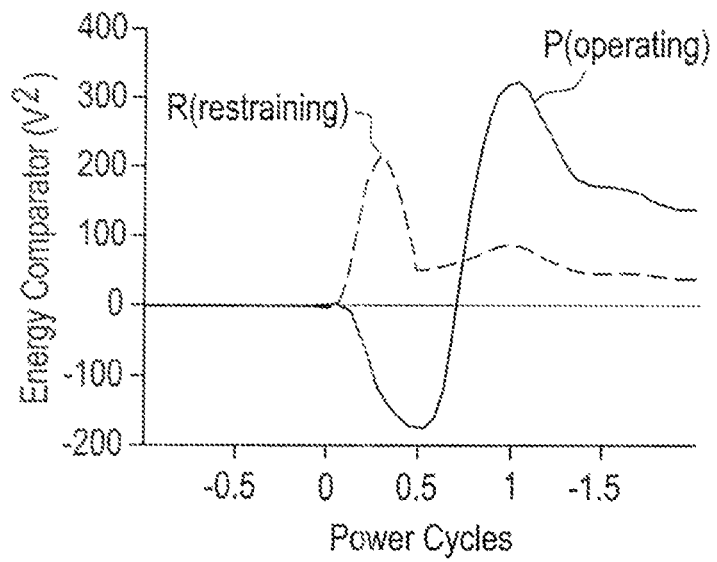

FIGS. 6 and 7 illustrate operation of the first stage energy comparator for the in-zone and out-of-zone faults, respectively. FIG. 6A shows a sample operating and polarizing signals and the resulting operating and restraining powers for the first stage of comparison is shown at FIG. 6B. For this in zone fault the operating power becomes higher than the restraining power at about 0.7 cycles into the fault.

Figure 7A:
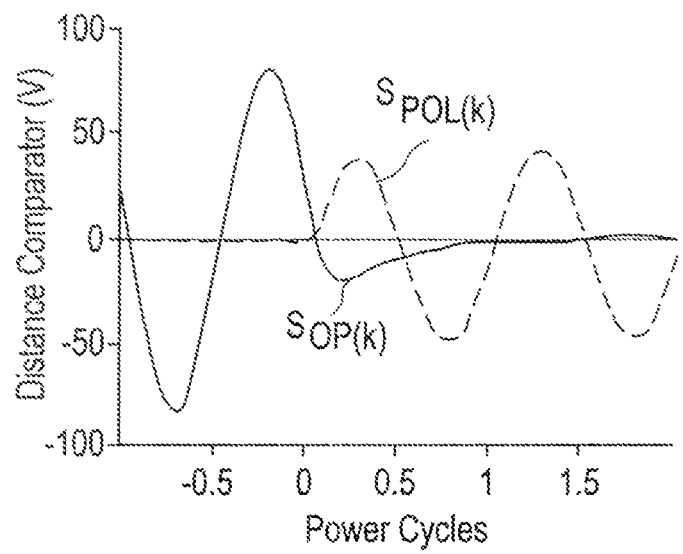
FIG. 7A shows a sample operating and polarizing signals and FIG. 7B shows the resulting operating and restraining powers for the first stage of comparison.
Figure 7B:
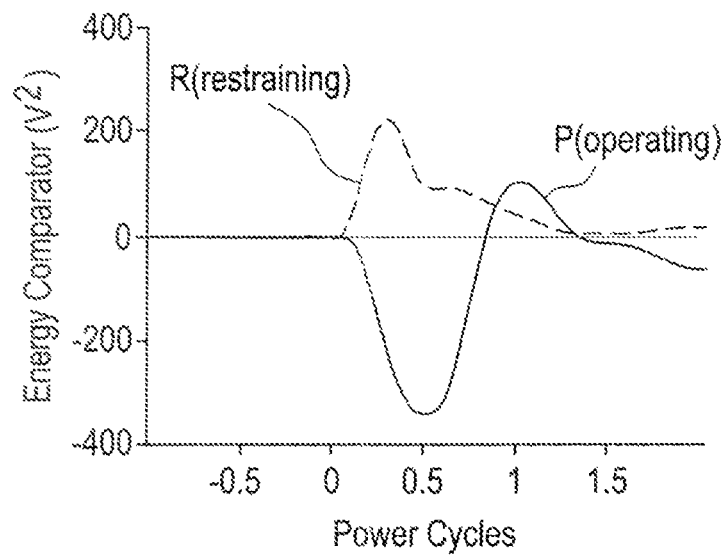

FIG. 7A shows a sample operating and polarizing signals and the resulting operating and restraining powers for the first stage of comparison is shown at FIG. 7B. For this out of zone fault the operating power drops below the restraining power after about 1.2 cycles into the fault. The operating power stays below the restraining power in the first half cycle of the event satisfying the design assumptions for the first stage of the comparator. FIG. 7B illustrates the danger of transient overreach due to CVT transients—the operating power is above restraining power during the time period between about 0.8 and 1.2 cycles. If not inhibited after 0.5 cycle, the first stage would have not respond properly on this fault case.

The first stage of comparison utilizing the energy comparator is active only during the first half a power cycle of a given system event. It has been verified by extensive simulations that CVT transients do not impact on security of this comparator before the first half a cycle. After the first half a cycle following the event, the first stage of comparison is inhibited and stage 2 takes over as described further.

It is worth noting that the first stage uses both the magnitude and phase information embedded in the operating and polarizing signals. This brings an advantage of faster operation during clear (obvious) fault cases, as during such events the magnitude of the operating signal becomes very significant and biases the operating power toward faster increase. Stages 2 and 3 of our comparator are mainly based on the phase information, and reject the magnitude information to a significant degree for security in relation to CVT induced transients.

Enhanced Phase Comparator of the Second Stage

In the second stage between half a power cycle and full power cycle into the event, our invention uses a phase comparator to detect the in-phase/out-of-phase relationship between the operating and polarizing signals of a given distance comparator.

This choice can be better understood realizing that CVT errors peak after about half a cycle. Any comparator operating after half a cycle and naturally extending its window back in time for some fraction of a power cycle would be impacted with those heavy CVT transients. Our application of the phase comparison check puts less emphasis on the magnitude of the compared signals and more on their mutual relation in term of polarities. It is true that the CVTs affect severely polarities of their output signals as well, but we use extra inputs to the phase comparison to deal with this problem.

The second and third stages are described here using the same notation of operating and restraining powers as the first comparator stage, for consistency and ease of understanding. Those skilled in basic digital signal processing can easily re-arrange the math into multiple equivalent or near-equivalent forms.

In this stage the restraining power is not calculated but kept constant as follows:

$$R_D = K_{D2} \cdot \frac{N_1}{2} \quad \text{(Eq. 16a)}$$

$$R_Q = K_{Q2} \cdot \frac{N_1}{2} \quad \text{(Eq. 16b)}$$

The operating power is calculated as a sum of 0s and 1s in the 0.5 cycle sliding window:

$$P_{D(k)} = \sum_{i=0}^{i=\frac{N_1}{2}-1} pc_{D(k-i)} \quad \text{(Eq. 17a)}$$

$$P_{Q(k)} = \sum_{i=0}^{i=\frac{N_1}{2}-1} pc_{Q(k-i)} \quad \text{(Eq. 17b)}$$

Where the "pc" signals are phase comparison signals (Boolean) calculated using our enhanced approach.

The K-factors for the second stage are lower than in the first stage for better security. One application uses values in the range of 0.65 to 0.75 assuming the user limit angle of 90 degrees. It should be understood that the K values control security/speed balance and can be adjusted freely making tradeoffs in the performance. This invention is not limited to any specific value of K in any of the comparators.

In a traditional phase comparison approach, the pc signals are asserted as logic 1 when both the compared signals are of the same polarity that is both are positive or both are negative at any given point in time. In our approach, this simple rule is expanded for extra security with respect to the CVT transients.

The second stage of our comparator asserts the pc signals as follows.

For the D-comparator:

$$pc_{D(k)} = \left\{ \left( \left( \frac{dx_{OP}}{dt}(k) > C_{CUT} \right) \& \left( \frac{dx_{POL}}{dt}(k) > C_{CUT} \right) \& \right. \right. \quad \text{(Eq. 18a)}$$

$$(x_{OPQ}(k) < -C_{CUT}) \right) \ldots \text{OR}$$

$$\left( \left( \frac{dx_{OP}}{dt}(k) < -C_{CUT} \right) \& \left( \frac{dx_{POL}}{dt}(k) < -C_{CUT} \right) \& \right.$$

$$\left. (x_{OPQ}(k) > C_{CUT}) \right) \right\} \& \ldots \&$$

$$\{((x_{OP}(k) > C_{CUT}) \& (x_{POL}(k) > C_{CUT}))$$

$$\text{OR}$$

$$((x_{OP}(k) < -C_{CUT}) \& (x_{POL}(k) < -C_{CUT}))\}$$

For the Q-comparator:

$$pc_{Q(k)} = \quad \text{(Eq. 18b)}$$

$$\left\{ \left( \left( \frac{dx_{OPQ}}{dt}(k) > C_{CUT} \right) \& \left( \frac{dx_{POLQ}}{dt}(k) > C_{CUT} \right) \& (x_{OP}(k) > \right. \right.$$

$$\left. C_{CUT}) \right) \ldots \text{OR} \left( \left( \frac{dx_{OPQ}}{dt}(k) < -C_{CUT} \right) \& \right.$$

$$\left( \frac{dx_{POLQ}}{dt}(k) < -C_{CUT} \right) \&$$

$$\left. (x_{OPQ}(k) < -C_{CUT}) \right) \right\} \& \ldots \&$$

$$\{((x_{OPQ}(k) > C_{CUT}) \& (x_{POLQ}(k) > C_{CUT}))$$

$$\text{OR}$$

$$((x_{OPQ}(k) < -C_{CUT}) \& (x_{POLQ}(k) < -C_{CUT}))\}$$

The $C_{CUT}$ threshold is set at approximately 0.25% of the nominal voltage. When the fault point approaches the intended reach point, the operating signal of the reach comparator approaches zero. Actually, for metallic faults exactly at the reach point the operating signal is exactly zero, not counting signal noise and distortion of course. For in-zone faults when the fault moves from the perfect balance point at the end of the zone, the operating signal increases and stays in phase with respect to the polarizing signal. For out-of-zone faults when the fault moves away from the reach point the operating signal increases and stays out of phase with respect to the polarizing signal. Therefore an arbitrary threshold is used ($C_{CUT}$) to determine if the signals are significant enough to be even compared with each other in terms of polarity.

In general equations (18) are enhanced phase comparison algorithms. They check polarities of the operating and polarizing signals, as well as overall symmetry of these signals, speed of rotation, and the overall behavior in terms of signal to noise ratio. For example, take the first three components in the pep term. If the operating and polarizing signals (D components) are in phase, their time derivatives are in phase too. At the same time the Q component must be exactly out of phase with the first two terms if the signals are well behaved. Overall, the pc signals are designed to yield a constant logic 1 if the polarizing signals and operating are pure sine waves and are exactly in phase, and yield a solid logic 0 if there are precisely out of phase and/or severely distorted. Note that within the integration window of half a cycle as per equations (17), the pc signals can assume both 0 and 1 based on the behavior of the signals. This allows integrating pieces of information toward fast but secure decision as to the location of the fault (in-zone or out-of-zone).

It should be noted that extra terms may be added to equations (18) with the effect of improving security to some extent at the expense of the speed of operation, and some terms can be removed from equations (18) with the effect of improved speed at the expense of security and transient accuracy. Our claim is to use at least one derivative of the operating or polarizing signal in order to enhance the classical phase comparison technique, regardless of the exact number of terms inserted into equation (18). One particular implementation uses the exact format given by equations (18) above.

The algorithm confirms an in-zone fault when the operating power is above the restraining power.

Figure 8A:
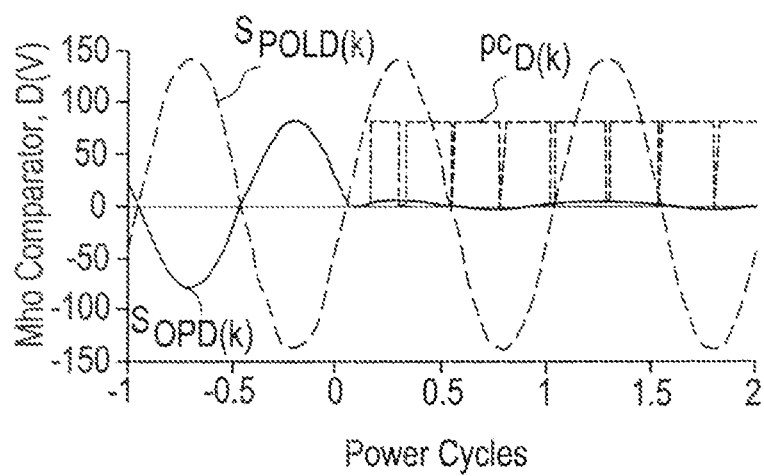
FIG. 8A shows a sample operating and polarizing signals and FIG. 8B shows the resulting operating and restraining powers for the second stage of comparison.
Figure 8B:
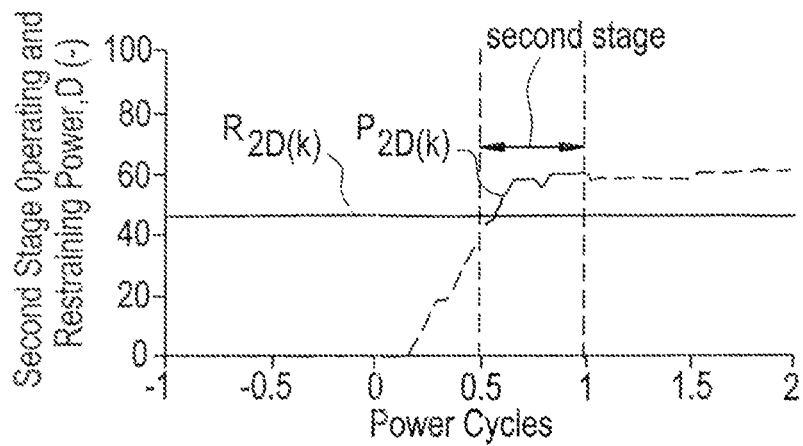

FIGS. 8A and 8B illustrates the second stage of comparison by showing a sample in-zone fault case. FIG. 8A shows a sample operating and polarizing signals and at FIG. 8B the resulting operating and restraining powers for the second stage of comparison is shown. For this in zone fault the operating power becomes higher than the restraining power at about 0.6 of a power cycle.

Enhanced Phase Comparator of the Third Stage

The third stage of comparison takes over after one power system cycle, and continues until the end of the second cycle when the entire algorithm becomes inhibited for security purposes. At that time protection is provided by a parallel more traditional solution such as the one described in U.S. Pat. No. 6,420,875, entitled "CVT Transient Filter," issued Jul. 16, 2002, the disclosure of which is herein incorporated by reference.

The third stage uses a similar phase comparison approach as follows. In this stage the restraining power is not calculated but constant as follows:

$$R_D = K_{D3} \cdot \frac{3N_1}{4} \quad \text{(Eq. 19a)}$$

$$R_D = K_{Q3} \cdot \frac{3N_1}{4} \quad \text{(Eq. 19b)}$$

The operating power is calculated as a sum of 0s and 1s in the 0.75 cycle sliding window:

$$P_{D(k)} = \sum_{i=0}^{i=\frac{3N_1}{4}-1} pc_{D(k-i)} \quad \text{(Eq. 20a)}$$

$$P_{Q(k)} = \sum_{i=0}^{i=\frac{3N_1}{4}-1} pc_{Q(k-i)} \quad \text{(Eq. 20b)}$$

Where the "pc" signals are calculated using the following equations:
For the D-comparator:

$$pc_{D(k)} = \quad \text{(Eq. 21a)}$$
$$\left\{ \left( \left( \frac{dx_{OP}}{dt}(k) > C_{CUT} \right) \& \left( \frac{d^2 x_{OP}}{dt^2}\left(k - \frac{N_1}{4}\right) > C_{CUT} \right) \& (x_{OPQ}(k) < -C_{CUT}) \& \right.\right.$$
$$\left( \frac{dx_{POL}}{dt}(k) > C_{CUT} \right) \& (x_{POLQ}(k) < -C_{CUT}) \&$$
$$\left. \left( \frac{d^2 x_{OP}}{dt^2}\left(k - \frac{3N_1}{4}\right) < -C_{CUT} \right) \right) \text{OR}$$
$$\left( \left( \frac{dx_{OP}}{dt}(k) < -C_{CUT} \right) \& \left( \frac{d^2 x_{OP}}{dt^2}\left(k - \frac{N_1}{4}\right) < -C_{CUT} \right) \& \right.$$
$$(x_{OPQ}(k) > C_{CUT}) \&$$
$$\left( \frac{dx_{POL}}{dt}(k) < -C_{CUT} \right) \& (x_{POLQ}(k) > C_{CUT}) \&$$
$$\left. \left. \left( \frac{d^2 x_{OP}}{dt^2}\left(k - \frac{3N_1}{4}\right) > C_{CUT} \right) \right) \right\}$$

For the Q-comparator:

$$pc_{Q(k)} = \quad \text{(Eq. 21b)}$$
$$\left\{ \left( \left( \frac{dx_{OPQ}}{dt}(k) > C_{CUT} \right) \& \left( \frac{d^2 x_{OPQ}}{dt^2}\left(k - \frac{N_1}{4}\right) > C_{CUT} \right) \& \right.\right.$$
$$(x_{OP}(k) > C_{CUT}) \&$$
$$\left( \frac{dx_{POLQ}}{dt}(k) > C_{CUT} \right) \& (x_{POL}(k) > C_{CUT}) \&$$
$$\left. \left( \frac{d^2 x_{OPQ}}{dt^2}\left(k - \frac{3N_1}{4}\right) < -C_{CUT} \right) \right) \text{OR}$$
$$\left( \left( \frac{dx_{OPQ}}{dt}(k) < -C_{CUT} \right) \& \left( \frac{d^2 x_{OPQ}}{dt^2}\left(k - \frac{N_1}{4}\right) < -C_{CUT} \right) \right.$$
$$\& (x_{OP}(k) < -C_{CUT}) \& \left( \frac{dx_{POLQ}}{dt}(k) < -C_{CUT} \right) \&$$
$$(x_{POL}(k) < -C_{CUT}) \&$$
$$\left. \left. \left( \frac{d^2 x_{OPQ}}{dt^2}\left(k - \frac{3N_1}{4}\right) > C_{CUT} \right) \right) \right\}$$

Note that some expressions repeat between stages 2 and 3. This could be used to optimize the calculations in a given implementation on a microprocessor-based relay.

Again, a flag signifying an internal fault is asserted when the operating power (Eq.20) is above the restraining power (Eq.19). The K factors balance speed and security and in one particular implementation of this invention are adjusted at about 0.5 to 0.75 assuming a user angle limit setting of 90 degrees.

It should be noted that extra terms may be added to equations (21) with the effect of improving security to some extent at the expense of the speed of operation, and some terms can be removed from equations (21) with the effect of improved speed at the expense of security and transient accuracy. Our claim is to use at least one derivative of the operating or polarizing signal in order to enhance the classical phase comparison technique, regardless of the exact number of terms inserted into equation (21). One particular implementation uses the exact format given by equations (21) above.

Expressions for the pc signals in the second and third stages of the comparison use time derivatives in addition to using straight values of the signals. The exact numerical implementation of the derivative is not critical, and this invention is not limited to any specific implementation. One particular implementation uses a simple two-point numerical derivative as follows:

$$\frac{dx}{dt}(k) = C_{dt} \cdot (x_{(k)} - x_{(k-1)}) \quad \text{(Eq. 22a)}$$

The above expression is scaled to have a unity gain at the nominal frequency, and therefore:

$$C_{dt} = \frac{1}{\alpha} = \frac{N_1}{2 \cdot \pi} \quad \text{(Eq. 22b)}$$

The second order derivative is a cascade of the filter (Eq.22a) applied twice. The derivatives need to be calculated with reasonable accuracy. However, their only usage is to be compared with a relatively low value to detect their polarity.

The third stage asserts a flag signifying internal fault if the operating power (Eq.20) exceeds the restraining power (Eq.19).

Figure 9A:
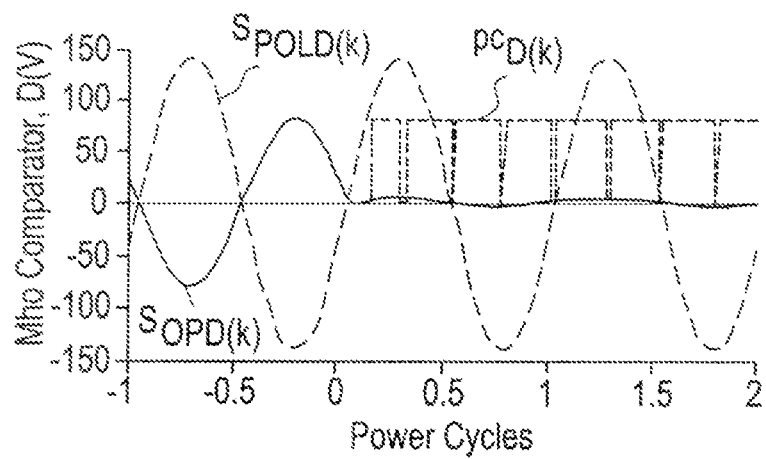
FIG. 9A shows a sample operating and polarizing signals.
Figure 9B:
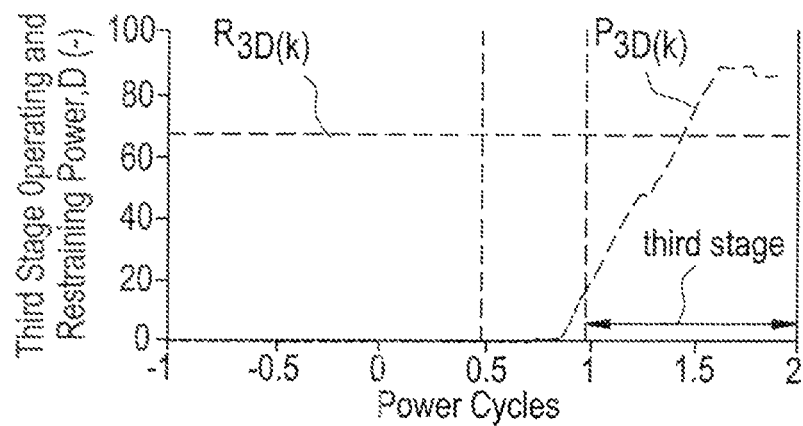
FIG. 9B shows the resulting operating and restraining powers for the third stage of comparison.

FIGS. 9A and 9B illustrate the third stage of comparison by showing a sample in-zone fault case. FIG. 9A shows a sample operating and polarizing signals and the resulting operating and restraining powers for the third stage of comparison is shown at FIG. 9B. For this in zone fault the operating power becomes higher than the restraining power at about 1.4 of a power cycle.

In the above description the three stages of comparison are switched on and off at 0.5 cycle, 1.0 cycle and 2.0 cycles into the fault. These switchover points are to be understood as approximations. Those skilled in the art can apply the slightly different breakpoints while adjusting other parameters in the algorithm to retain security and speed of operation. For example, the first stage can be switched off a little bit later than after 0.5 cycle if the K factor of this stage is set higher. This will penalize proportionally the speed of operation, but would yield a relatively well-behaved algorithm.

Integration of the Method within the Overall Impedance Protection Function

The method of this invention can be applied to various types of distance characteristics and impedance comparators. All practically known distance characteristics can be written in the implementation format of a set of operating and polarizing signals, in such a way that the two are approximately in-phase for in-zone faults, and out-of-phase otherwise. If so, our approach of instantaneous operating and polarizing signals derived digitally on a microprocessor-based relay can be applied. The three-stage comparator is also applicable to any distance characteristic.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

The capabilities of the present invention can be implemented in software, firmware, hardware or some combination thereof.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

What is claimed is:

1. An article of manufacture that includes a non-transitory computer readable medium useable by a processor, the medium having stored thereon a sequence of instructions which, when executed by the processor, causes the processor to provide impedance protection in transmission lines, wherein the impedance protection is provided by:

interfacing, inputting, and digitizing voltages and currents associated with the transmission lines for a first distance zone;

digitally filtering the digitized currents and voltages, with a pair of orthogonal filters, into derived pairs of orthogonal components;

digitally extracting instantaneous operating signals and instantaneous polarizing signals from the derived pairs of orthogonal components;

digitally comparing a first stage angular and magnitude relationship between the instantaneous operating and polarizing signals during a first half-cycle of a first power cycle in a fault event to determine if a fault is within the first distance zone;

digitally comparing a second stage angular and polarization relationship between the instantaneous operating and polarizing signals during a second half-cycle of the first power cycle in the fault event to determine if the fault is within the first distance zone;

digitally comparing a third stage angular and polarization relationship between the instantaneous operating and polarizing signals during a second power cycle, immediately subsequent to the first power cycle, in the fault event to determine if the fault is within the first distance zone; and outputting an impedance protection signal indicative of the first, second, and third stage comparison determinations, wherein at least one of the second and third stage comparisons respond to signal polarities defined by exceeding a finite non-zero threshold rather than a mathematical zero (0).

2. The article of manufacture of claim 1, wherein the derived pairs of orthogonal components are derived using digital filters effectively introducing less than half a cycle delay into the orthogonal components.

3. The article of manufacture of claim 1, wherein the pair of orthogonal filters are of Finite Impulse Response (FIR) or Infinite Impulse Response (IIR).

4. The article of manufacture of claim 1, wherein the first, second, and third stage comparisons compare terms created in a time domain as instantaneous combinations of orthogonal voltages and currents.

5. The article of manufacture of claim 4, wherein at least two sets of terms are used for better speed of response in the first, second, and third stage comparisons.

6. The article of manufacture of claim 1, wherein the first stage comparison responds to both magnitude and phase information of the instantaneous operating and polarizing signals and is time limited to a fraction of the first power cycle following the fault event.

7. The article of manufacture of claim 1, wherein the second and third stage comparisons respond primarily to phase information in the instantaneous operating and polarizing signals.

8. The article of manufacture of claim 6, wherein an energy comparator is used to check the relationship between the instantaneous operating and polarizing signals.

9. The article of manufacture of claim 6, wherein a phase comparison check approach is used to check the relationship between the instantaneous operating and polarizing signals.

10. The article of manufacture of claim 9, wherein the phase comparison check approach includes at least one time derivative of the instantaneous polarizing or the instantaneous operating signal, the time derivative being of any order.

11. The article of manufacture of claim 9, wherein the phase comparison check approach includes at least one time delayed value of the instantaneous polarizing or the instantaneous operating signal.

* * * * *